United States Patent [19]

Forgione

[11] 3,822,380

[45] July 2, 1974

[54] DIGITALLY CONTROLLED SIGNAL GENERATOR

[75] Inventor: James R. Forgione, San Diego, Calif.

[73] Assignee: General Dynamics Corporation, San Diego, Calif.

[22] Filed: May 25, 1973

[21] Appl. No.: 364,188

[52] U.S. Cl. ............ 235/197, 235/150.53, 235/152, 328/14

[51] Int. Cl. ............ G06f 15/34

[58] Field of Search ............ 235/197, 150.53, 152; 328/14; 340/172.5, 347 DA

[56] References Cited

UNITED STATES PATENTS

| | | | |
|---|---|---|---|
| 3,633,017 | 1/1972 | Crooke | 235/197 X |
| 3,654,450 | 4/1972 | Webb | 235/152 X |
| 3,689,914 | 9/1972 | Butler | 235/197 X |
| 3,739,374 | 6/1973 | Kiowski | 235/197 X |

*Primary Examiner*—Joseph F. Ruggiero
*Attorney, Agent, or Firm*—Martin Lukacher

[57] ABSTRACT

A complex waveform synthesizer includes a main memory unit consisting of recirculating shift registers which store a large number of digital words which are loaded into the main memory from a central processing unit to generate selected functions which are represented by analog signals after conversion in a digital to analog converter. The variations of the signal from the converter as a function of time are determined by the rate at which digital signals from an idle memory are applied to the main memory to readout the digital words stored therein to the digital to analog converter on a repetitive basis. The idle memory consists of a recirculating shift register which may also be loaded by the computer. The rate at which the digital signals are shifted out of the idle memory is determined by a digital frequency synthesizer which also may be programmed by the computer.

12 Claims, 7 Drawing Figures

DIGITALLY CONTROLLED SIGNAL GENERATOR

The present invention relates to a function generator system and more particularly to a system which produces an output signal which is a digitally selected function of time.

The invention is especially suitable for use in a computer controlled automatic test station for testing electronic equipment, such as radios, radars, and the like, and when implemented in such a test station provides stimulus signals which can be applied to a unit under test and then analyzed by means of the computer to determine the condition of the unit under test.

The invention is also suitable for use in any application where it is desired to gnerate signals, either digital or analog and which represent almost any arbitrary function.

Conventionally, when a large number of signals are to be generated for use in a single instrument or application, there are provided several different signal generator devices, one for each of the signals. These devices may be square-wave generators, sine-wave generators, ramp generators, and other time variance signal generators which are selectively connected to a unit under test or to other devices used in the overall system. While it has been suggested that it would be desirable to provide a single apparatus or system capable of generating any and all of the signals which may be needed, as and when the signals are required, such single systems as have been suggested for the purpose are either limited in the types of waveforms which they have within their capability to generate (see for example U.S. Pat. No. 3,529,138) or require that a large quantity of complex analog (see U.S. Pat. No. 3,617,726) or digital (see U.S. Pat. No. 3,164,807) equipment be dedicated for the exclusive purpose of generating the many signals.

It is an object of the present invention to provide an improved system for generating a large number of complex functions without the large amount of equipment and complexity which have characterized prior systems for the purpose.

It is a further object of the present invention to provide an improved function generator system which is digitally controlled to select the desired function represented by the signal without the need for dedicating a computer or other data processing unit exclusively for function generating purposes.

It is a general object of the invention to provide an improved signal generator system for generating signals having various waveforms.

It is another object of the present invention to provide an improved system which is programmable to generate signals representing different amplitude functions of time.

It is still another object of the present invention to provide an improved system which is digitally operable and programmable to selectively generate various signals, such as square waves, ramps, triangular waves, sine waves, and complex modulation patterns as well as other waves, and which requires relatively small amounts of hardware dedicated to signal generation purposes.

It is a still further object of the present invention to provide an improved source of stimulus signals for computer operated automatic test stations wherein the wave-form of the stimulus signals is selected by the same computer as is operative to analyze the results of tests performed by the test station.

It is a still further object of the present invention to provide an improved system for digitally synthesizing complex waveforms to produce various digital or analog signals for various purposes.

It is a still further object of the present invention to provide an improved computer controlled waveform synthesizer wherein the computer is not dedicated to the waveform synthesis operations of the system but can serve other functions, as for example the analysis of such waveforms when they are applied in the testing of other electronic equipment.

Briefly described, a function generator system embodying the invention has separate systems, each of which is adapted to be controlled by a central processing unit in accordance with programs or software routines applied to the central processing unit, to generate the output signals representing selected functions. The first of these subsystems determines the amplitude characteristics of the function while the second of the subsystems determines the time characteristics of the function. The first system comprises a main memory unit which may be loaded from the central processing unit with digital words which characterize the amplitude of successive segmental portions of the waveform of the function. The second subsystem comprises another memory which is loaded with a further digital word consisting of a series of digital signals, also from the computer in accordance with the time characteristics of the function. By reading out the digital word in the memory of the first system at a rate determined by the digital word in the memory of the second subsystem, both the amplitude and time characteristics of the waveform is provided. The digital words as read out of the second subsystem memory, may be applied to a digital to analog converter so as to convert the function from digital to analog form, and provide an analog signal corresponding to the desired function.

The foregiong and other objects and advantages of the present invention as well as additional features thereof, will become more readily apparent from a reading of the following specifications in connection with the accompanying drawings in which.

Figure 1:
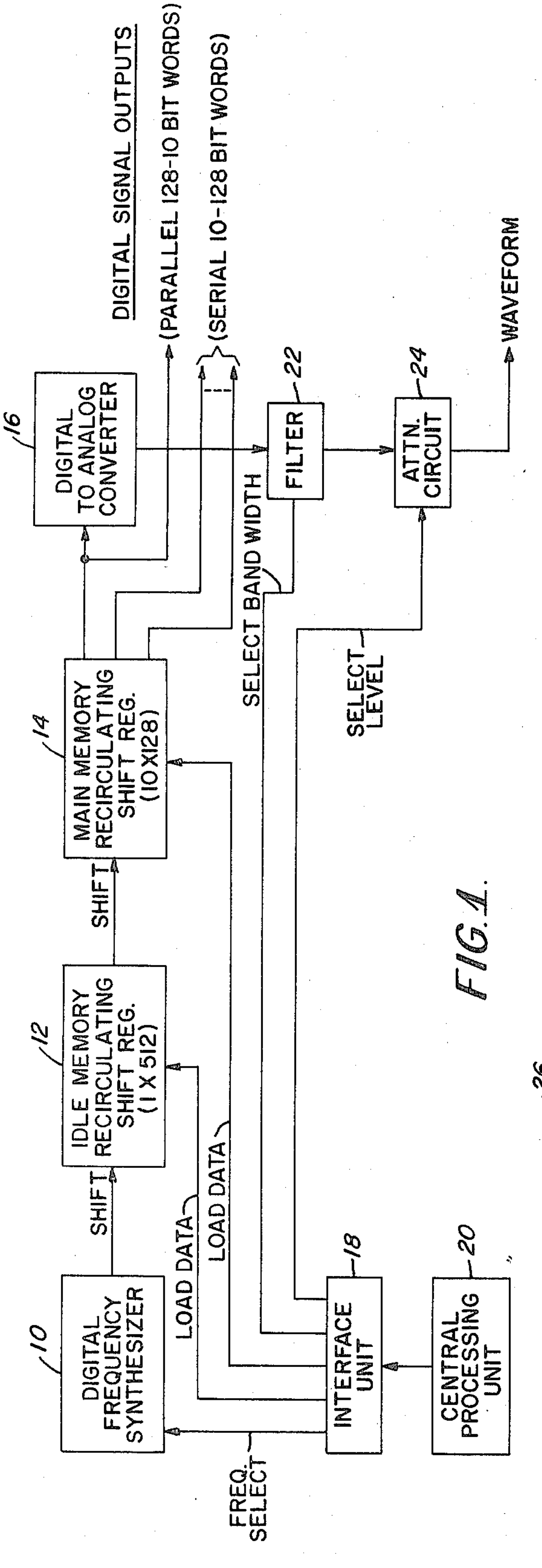
FIG. 1 is a block diagram schematically illustrating a signal generator system embodying the invention.

Referring now more particularly to FIG. 1 of the drawings, there is shown a function generator system which is capable of synthesizing numerous complex waveforms and thus may be termed a complex waveform synthesizer. This synthesizer has two principal subsystems which respectively provide the amplitude and time characteristics of the waveform.

A digital synthesizer 10 and an idle memory 12, which in this embodiment of the invention is a recirculating shift register, constitute the subsystem which determines the time characteristics of the waveform. A main memory 14 provides the amplitude characteristic-determining subsystem. This main memory, in this embodiment of the invention, includes ten recirculating shift registers which separately store different bits of the 10-bit words which represent the amplitude of the successive segmental portions of the waveform. These words are applied to a digital to analog converter 16 repetitively at intervals determined by the frequency of the signal from the digital frequency synthesizer 10 and the value of the digital word stored in the idle memory 12. The digital to analog converter 16 then provides an analog waveform having the amplitude and time characteristics which are desired. Inasmuch as the values of the digital words in the main memory and the value of the digital word in the idle memory, as well as the frequency of the signal from the digital synthesizer, may be arbitrarily controlled, a signal having a waveform which is any arbitrary function of time, may be generated by the system. The digital words, either serial of parallel can be obtained from the digital signal outputs of the main memory 14. These digital signals may be used as pulse or square wave stimuli sources. By loading the memories 12 and 14 with certain bit sequences, digital outputs in the form of various telemetry codes, pseudo random noise codes, etc., can be provided.

A central processing unit 20, which may be a computer, such as the Varian Model 620/L mini-computer, sold by Varian Data Machines of Irvine, California, may be programmed either manually or by means of stored software routines or programs contained in the memory of the computer or in any auxiliary tape or disc mechanism associated therewith, to provide the necessary digital words which are loaded into the idle memory 12 and the main memory 14 through an interface unit 18. A digital word which controls the digital frequency synthesizer 10 is also applied thereto through the interface unit 18.

Once the computer or central processing unit 20 has loaded the digital word required for the memories 12 and 14, and for the synthesizer 10, the central processing unit 20 may be used for any other purposes, such as analysis of sample data derived from electronic equipment under test through which the waveforms generated by the system have been applied as stimuli. The central processing unit, with its associated printer may then print out data representing the condition of the unit under test. Various different signals may be synthesized and successive tests on the electronic equipment conducted in accordance with software routine (viz., programs) which operate the central processing unit 20. In other words, the central processing unit is not dedicated to the complex waveform synthesizer system, but merely controls that system on a coordinated basis with other functions, for example, functions which may be associated with an automatic test station in which the waveform synthesizer system is included, so as to run such sequences of tests as are necessary or desirable to automatically test and determine the operating condition of any electronic equipment under test, whether it be radio equipment, radar equipment, or any other equipment or circuitry which is adapted to be tested by the application thereto of certain waveforms.

The signal from the digital to analog converter may be processed in a filter 22 and then in an attenuator circuit 24. The filter may include different filter networks with different bandwidths selected in accordance with digital words from the central processing unit which are applied to the filter 22 through the interface unit 18 during the loading cycle of the system. Similarly, the attenuator circuit may include a ladder network which controls the gain of an amplifier through which the filtered waveform is transmitted to the analog waveform output of the system. The resistors constituting the ladder network may be selected by means of a digital word which is loaded from the central processing unit through the interface unit 18 during the load cycle of the system. Accordingly, the bandwidth and amplitude level of the waveform may be selected under control of the central processing unit. Inasmuch as filters which are digitally controllable to change their bandwidth and attenuator circuit of the type mentioned above, may be designed in accordance with techniques known in the art, they are not described in detail herein.

Figure 2:
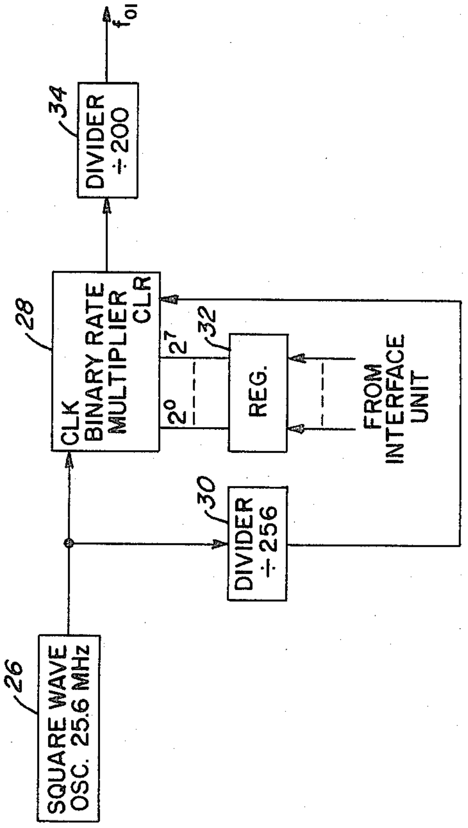
FIG. 2 is a block diagram of the digital frequency synthesizer of the system shown in FIG. 1.

The digital frequency synthesizer 10 is illustrated in greater detail in FIG. 2. A square wave oscillator 26 which may be a crystal controlled oscillator followed by a clipping circuit, produces the signals which in this illustrative example are indicated as being 25.6 MHz. These signals are applied to the clock input of binary rate multiplier, which is available in integrated circuit form; type SN 7497, sold by Texas Instruments, being suitable. This binary rate multiplier circuit is available in a six-bit configuration and two of such units connected in series provide the eight-bit capacity ($2^0$ to $2^7$) as indicated in the drawing. Binary rate multipliers include a register such as the register 32 which is connected to the interface unit 18 so as to store the eight-bit digital word which determines the scaling factor of the rate multiplier. Rate multipliers themselves are generally well-known and reference may be had to the U.S. Pat. No. 3,671,871 for a more detailed description of a binary rate multiplier. The square wave oscillator 26 applies clock signals of a constant frequency to the rate multiplier 28. These signals are divided by 256 and applied to the clear input of the multiplier 28. The output of the multiplier is divided as in a counter type divider circuit 34, to produce an output pulse train at a rate $F_{o1}$. The output frequency from the synthesizer 10 including the binary rate multiplier is therefore given by the following equation:

$$F_{o1} = F_{osc}\ (X/2N) \cdot 1/D$$

where in this illustrative embodiment $N = 8$, $D = 200$ and $F_{osc} = 25.6$ MHz. $X$ is the value of the digital word from the interface unit which is stored in the register 32, and $D$ is the dividing ratio of the divider 34. Inasmuch as this word had eight binary bits, the value thereof may be any number from zero to 256. Accordingly, the output frequency $F_{o1}$ can be digitally selected to vary from zero to 128 KHz in steps of 500 Hz.

The divider 34 is provided so as to eliminate jitter from the output signal. The digital frequency synthesizer 10 thus provides a reference signal, the repetition rate of which may be digitally selected from the central processing unit 20.

Figure 3:
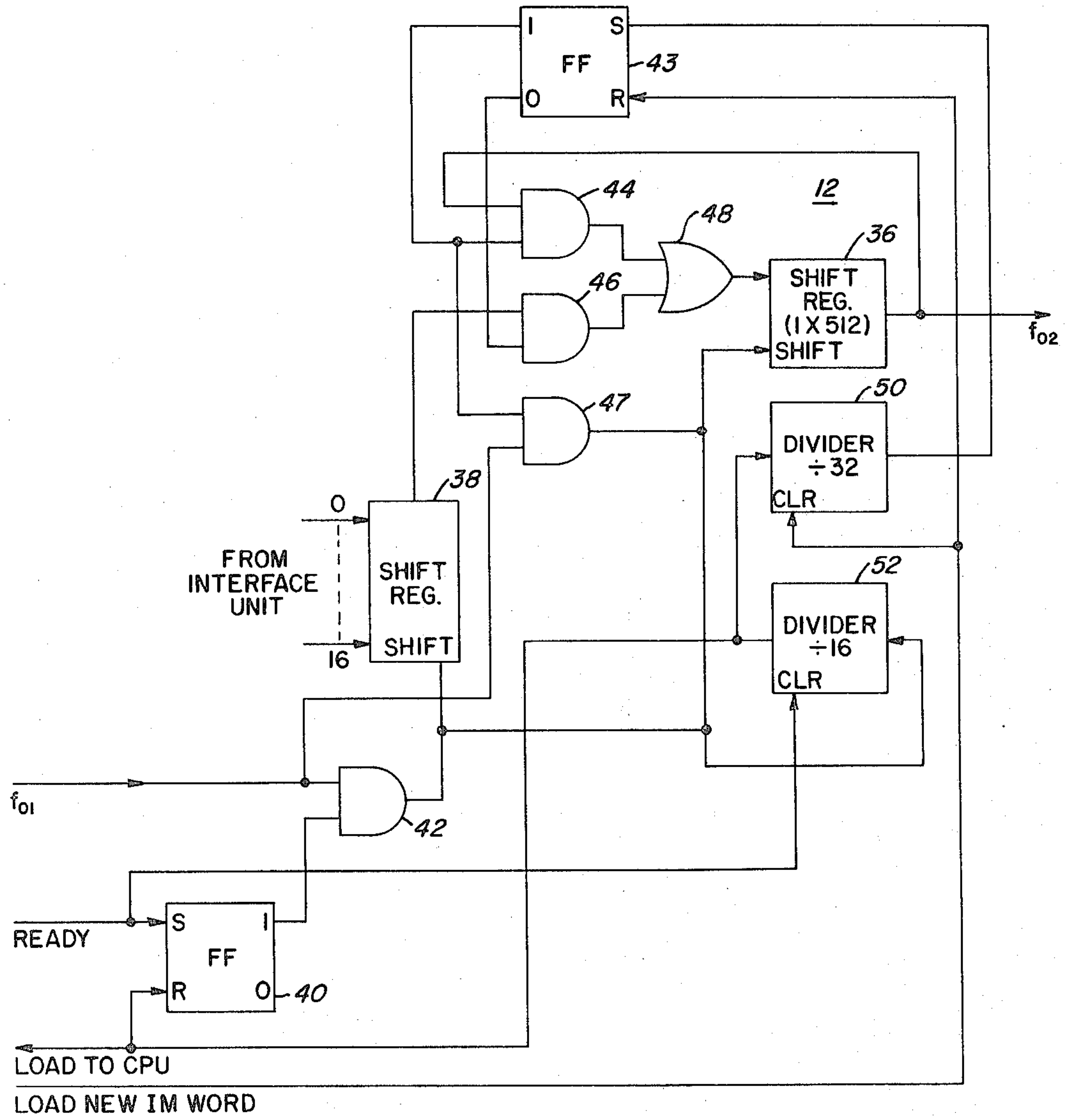
FIG. 3 is a schematic diagram, in block form, illustrating the idle memory of the system shown in FIG. 1.
Figure 4:
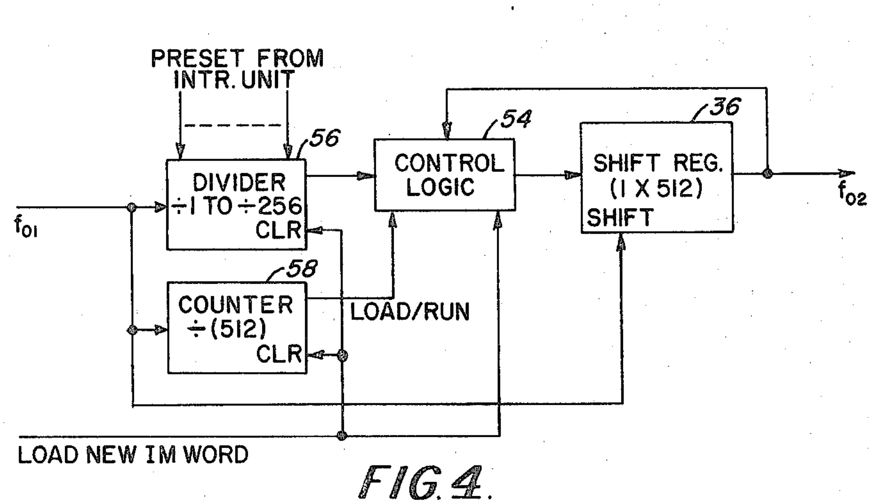
FIG. 4 is a block diagram of an alternate idle memory which may be used in the system shown in FIG. 1.

The idle memory may be provided by the subsystem shown in FIG. 3 or in FIG. 4. The idle memory provides the timing of the readout from the main memory to be a pre-programmed function. In other words, the rate at which the waveform is digitally controllable through the use of the idle memory.

The memory shown in FIG. 3 has as its principal component a shift register 36 which in this illustrative embodiment is 512 bits long (i.e., it has storage for 512 digital signals). This shift register may be made up of a series of four 128-bit registers which are available in integrated circuit form in two dual 128-bit shift register units (Signetics 252N being suitable). The 512-bit digital word is either loaded into the shift register or the word therein circulated around the shift register 36 by control logic including a pair of AND gates 44 and 46, and an OR gate 48. Loading is from a shift register 38 which may be separate from or part of the interface unit 18. This shift register 38 has a capacity of 16 bits to complement the 16-bit output of the Varian 620/L mini-computer which may be used as the central processing unit 20.

In the course of programming, the 16 bits may be manually entered by means of the switches on the front panel of the computer. Then by operating the step switch on the computer front panel, the 16-bit words are read out of the computer into the shift register 38. The 16-bit word may also be read out automatically under program control.

When a command to load a new idle memory word is applied to the idle memory system, a divide-by-32 divider 50 and a divide-by-16 divider 52 are cleared. A flip-flop 43 which controls the AND gates 44, 46 and 47 is also reset so as to enable the gate and 47 and inhibit the gates 44 and 47. Clock pulses which may be the $F_{o1}$ signal from the digital frequency synthesizer are then applied to the divide-by-16 divider 52. A ready signal from the computer sets a flip-flop 40 and enables an AND gate 42 which applies the $F_{o1}$ signal as clock pulses to shift the 16 bits out of the shift register 38 through the gates 46 and 48 serially into the data entry input of the shift register 36. Simultaneously, the clock pulses shift those data bits from register 38 into the register 36. When 16 bits are counted the flip-flop 40 is reset, thus inhibiting the AND gate 42 and stopping the flow of shift pulses to the register 36 and 38. When the computer 20 enters another 16 bits into the register 38 a ready command sets the flip-flop 40 and the 16 bits are entered into the shift register 36. The divider 50 counts each entry of 16 bits by counting the output of the divide-by-16 divider 52. After 32 16-bit words are entered into the shift register (a total of 512 bits) the divider 50 sets the flip-flop 43 which enables the recirculating path through the gates 44 and 48 around the shift register 36. $F_{o1}$ pulses to shift the digital signals around the shift register are then applied via an enabled AND gate 47. The gates 44, 46, 47 and 48 and the flip-flop 43 thus provide control logic for the idle memory.

The digital signal stored in the idle memory may either be "0" or "1" bits. The "1" bits represent the presence of a segmental value of the output waveform, while the "0" bits represent the absence thereof. Accordingly, the digital word determines the rate and timing of the waveform which will be produced by the system. The digital signals which are outputted from the shift register are indicated as having a frequency $F_{o2}$.

In the event that the complex waveform has a time characteristic which is irregular, a simplified idle memory shown in FIG. 4 may be used. This idle memory includes a shift register 36 identical to the register 36 shown in FIG. 3, and control logic 54 similar to the control logic described in connection with FIG. 3.

The digital words which are loaded into the shift register are obtained by dividing the digital frequency synthesizer output $F_{o1}$ by any number from zero to 256 determined by a preset divider 56. The preset input to the divider 56 may be obtained from a single 16-bit word loaded from the central processing unit 20 through the interface unit 18. A divide-by-512 counter 58 which counts the input pulses $F_{o1}$ switches the control logic from load to run condition after 512 $F_{o1}$ pulses are counted. In order to load a new word, a load new idle memory word command is applied to clear the dividers 56 and 58 and reset the control logic 54. By setting the dividing ratio to unity, a series of 512-one bits will be stored in the shift register. This will in effect make the idle memory output $F_{o2}$ equal to $F_{o1}$. When the dividing ratio of the divider 56 is 2, the digital word in the shift register will be alternately zero and 1's, and $F_{o2}$ will be $1/2F_{o1}$. Similarly, by increasing the dividing ratio of the divider 56, every third, fourth, etc., bit in the shift register will be a 1. Thus the output $F_{o2}$ of the idle memory may be selected to be integral sub-multiples of the $F_{o1}$ frequency, and frequencies between the 500 Hz steps of the $F_{o1}$ frequency may be produced by the use of the idle memory.

Figure 5:
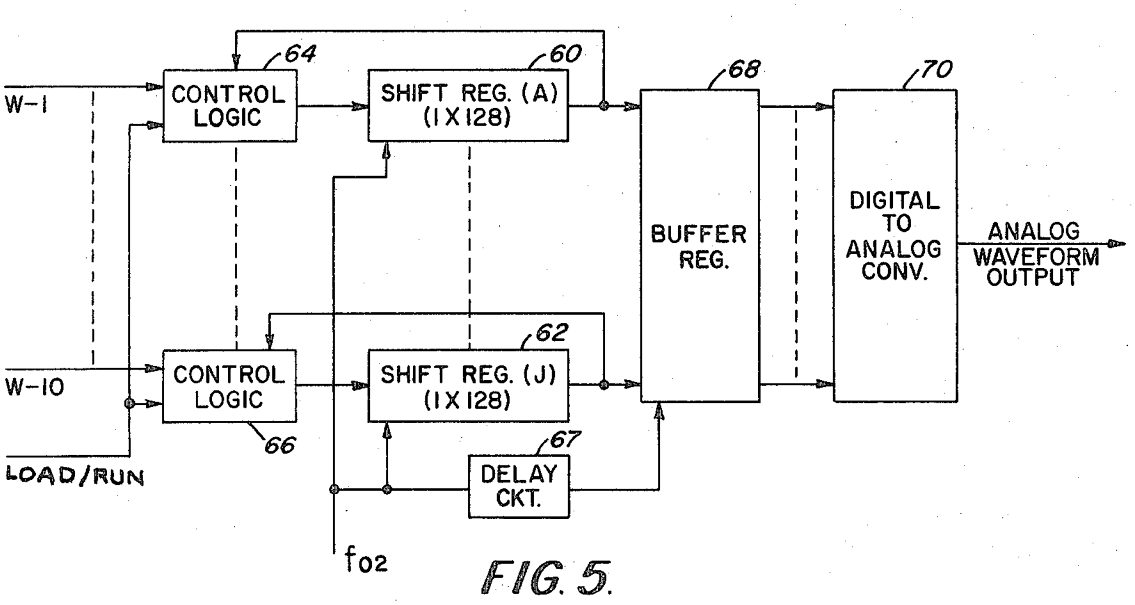
FIG. 5 is a block diagram illustrating the main memory of the system shown in FIG. 1.

A suitable main memory 14 is illustrated in FIG. 5. The memory consists of 10 128-bit shift registers, the first of which shift register (A) 60, and the last of which shift register (J) 62 are illustrated to simplify the drawing. Since dual 128-bit shift registers with a recirculating capability are available in integrated circuitry form, five of such shift registers will be sufficient to constitute the registers shown in FIG. 5. Shift pulses for these registers are obtained from the idle memory output $F_{o2}$. The shift register (A) stores the first bits of each of the 128-bit digital words stored in the registers of the main memory, while the shift register 62 stores the tenth bit of each of these words. Since the shift pulses $F_{o2}$ are applied simultaneously to each of the register 60 to 62, the 10-bit digital words will be shifted, one-bit position for each shift pulse. In order to accomodate the jitter unavoidable in shift register operation, a high-speed buffer register 68 is provided for storing the word shifted out of the register. This is accomplished by delaying the $F_{o2}$ shift pulses to the buffer register 68 through a delay circuit 67, such as an IC delay line or a one-shot. The $F_{o2}$ shift pulses clock the entry of successive digital words from the buffer register 68. The 10-bit words are clocked successively into a 10 -bit digital to analog coverter 70 to provide the analog waveform output. The 10 bits W-1 to W-10 which constitute each of the successive digital words are loaded into the shift registers through control logic associated with each of the registers, the logic 64 and 66 for the first and last register 60 and 62 being shown to simplify the drawings.

The load-run command from the central processing unit 20 is operative to inhibit the recirculation around the shift register through the control logic during loading of the registers 60 to 62 and establish the recirculation path during run operations. Loading is provided through the interface unit 18 which contains the registers for storing the 10-bit digital words delivered to the interface unit from the central processing unit. As in the case of the idle memory, the central processing unit may be operated manually through its front panel controls using only 10 bits of the 16-bit capability of the computer so as to transfer the manually selected bits into the interface unit by operation of the set control on the front panel. It is preferable, of course, to provide the digital word by means of software routine which will operate to automatically enter the words successively into the shift registers 60 to 62 of the memory 14. These programs may be written in accordance with conventional programming techniques such as are described in the Varian 620/L computer handbook, published by Varian Data Machines of Irvine, California (reference is made at this writing to the edition of said handbook copyright 1971 Varian Data Machines)

Figure 6:
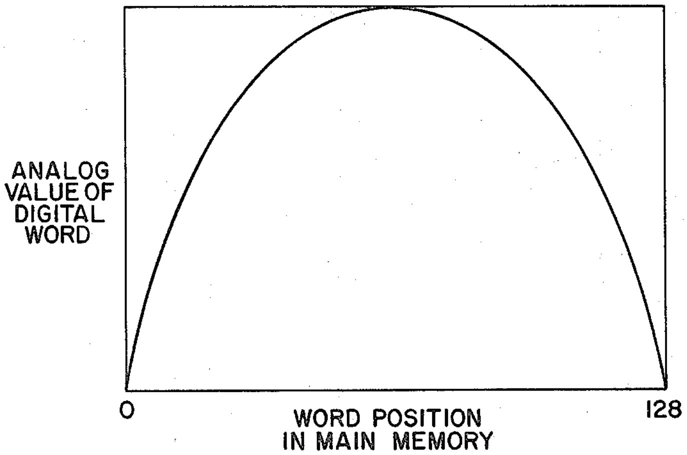
FIG. 6 and FIG. 6A are graphs and waveforms illustrative of the operation of the system shown in FIG. 1.
Figure 6A:
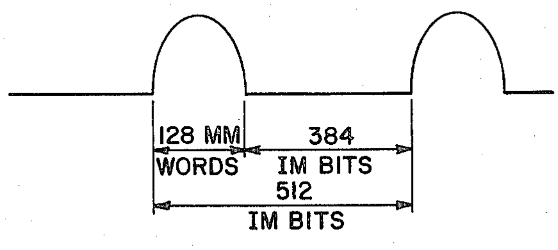

Each digital word stored in memory represent, by the value thereof, the amplitude of a successive segmental portion of the waveform to be generated. It will be appreciated of course that the digital words representing the leading edge of the waveform are inputted or loaded into memory first so that the 128 or lowest order position at the right-hand end of the memory contains the first segmental value of the waveform. The analog values of the digital word at various positions in memory, from position 1 to 128 for a half sine wave is shown in FIG. 6 by way of illustration. FIG. 6A illustrates how a non-summetric waveform can be generated with high resolution through the use of a properly programmed word in the idle memory. In this illustrative example, the main memory has a maximum length of 128 words. Consider that when the idle memory is programmed or loaded to contain all binary 1 signals, the minimum output frequency with maximum resolution would occur when the frequency synthesizer 26 is programmed to its highest output frequency (128 KHz). For the half sine wave illustrated, 180° of the function for 128 words or approximately 1.4° is the maximum resolution obtainable with the illustrated shift register main memory. Where the wave is periodic in nature of a low-duty cycle, this high resolution can be maintained by properly programming the idle memory, thus as shown in FIG. 6A, the idle memory can be programmed to load 128 1 bits in the first of its 512-bit positions and 384 zero bits in its next 384-bit positions. The full resolution of the main memory is then utilized and the idle memory performs a "dead time" simulation.

From the foregiong description of an illustrative embodiment of the invention and of the means and methods of operating the illustrated system, the flexibility and power of the invention for the digital synthesis of complex waveform will be apparent to those skilled in the art. Variations and modifications in the herein described system and in its means and methods of programming in operation within the scope of the invention will undoubtedly suggest themselves to those skilled in the art. Accordingly, the foregoing description should be taken merely as illustrative and not in any limiting sense.

What is claimed is:

1. A function generator system which produces an output signal which is a digitally selected function of time, said system comprising:

a. first memory means having storage for a plurality of digital words each representing a segmental value of said output signals, b. second memory means having storage for a plurality of digital signals each representing the presence and absence of a different one of said segmental value at different intervals of time, and c. means for reading said digital words successively out of said first memory under control of successive ones of digital signals in said second memory means to provide said output signal from said first memory means.

2. The invention as set forth in claim 1 further comprising a digital to analog converter, said readout means being operative to read said digital words from said first memory into said converter to produce said output signal as an analog signal.

3. The invention as set forth in claim 1 further comprising means for selectively providing signals having different frequencies corresponding to the frequency of said output signal, and means operated by said last named signals for reading out said second memory.

4. The invention as set forth in claim 1 including a central processing unit for generating said digital words and a further digital word consisting of said plurality of digital signals, and means for loading said first named digital words into said first memory means and said further digital word into said second memory means.

5. The invention as set forth in claim 4 including a source of reference frequency signals, and means for applying said reference frequency signals to said second memory for controlling the rate of said successive digital signals which are provided therefrom.

6. The invention as set forth in claim 5 wherein said first means includes first recirculating shift registers, said first-named digital words being stored serially in said registers, and wherein said reading out means includes means for applying said digital signals of said further word to said recirculating registers for shifting said first named words successively out of said registers.

7. The invention as set forth in claim 6 wherein said second memory is a second recirculating shift register, wherein said digital signals of which said further digital word consists are stored serially, and wherein said reference signal applying means includes means for applying said reference signals to said second register for shifting said digital signals successively out of said second register.

8. The invention as set forth in claim 7 wherein said loading means includes means for inhibiting the recirculation of said digital words in said first shift registers and in said second shift register, and means for serially shifting said first-named digital words and said further digital word into said first registers and said second register respectively.

9. The invention as set forth in claim 8 wherein said reference frequency signal source is a digital frequency synthesizer for providing said reference signals at frequencies corresponding to the value of a third digital word which is applied thereto, and means for applying said third word to said digital frequency synthesizer from said central processing unit.

10. The invention as set forth in claim 9 further comprising a digital to analog converter for converting said digital words shifted out of said first recirculating shift registers into said output signal in analog form.

11. The invention as set forth in claim 10 further comprising a filter connected to the output of said converter for filtering said output signal, and means operated by said central processing unit for selecting the bandwidth of said filter.

12. The invention as set forth in claim 10 further comprising an attenuator connected to the output of said converter for changing the amplitude of said output signal, and means operated by said central processing unit for selecting the resistance presented to said signal by said attenuator.

* * * * *